(12) United States Patent
Caporale et al.

(10) Patent No.: US 7,814,041 B2
(45) Date of Patent: Oct. 12, 2010

(54) SYSTEM AND METHOD FOR CONTROL AND TRAINING OF AVATARS IN AN INTERACTIVE ENVIRONMENT

(76) Inventors: John L. Caporale, P.O. Box 2077, Redmond, WA (US) 98073; Michael J. Caporale, P.O. Box 2077, Redmond, WA (US) 98073

( * ) Notice: Subject to any disclaimer, the term of this patent is extended or adjusted under 35 U.S.C. 154(b) by 875 days.

(21) Appl. No.: 11/688,770

(22) Filed: Mar. 20, 2007

(65) Prior Publication Data

US 2008/0235581 A1 Sep. 25, 2008

(51) Int. Cl.
*G06F 17/00* (2006.01)
*G06N 5/02* (2006.01)

(52) U.S. Cl. ....................................... 706/51
(58) Field of Classification Search .............. 706/51
See application file for complete search history.

(56) References Cited

U.S. PATENT DOCUMENTS

| | | | |
|---|---|---|---|
| 7,027,055 B2 * | 4/2006 | Anderson et al. | 345/473 |
| 7,090,576 B2 | 8/2006 | Herbrich et al. | |
| 2003/0004774 A1 | 1/2003 | Greene et al. | |
| 2004/0221224 A1 | 11/2004 | Blattner et al. | |
| 2005/0137015 A1 | 6/2005 | Rogers et al. | |
| 2006/0122840 A1 * | 6/2006 | Anderson et al. | 704/275 |
| 2009/0216691 A1 * | 8/2009 | Borzestowski et al. | 706/11 |
| 2010/0179916 A1 * | 7/2010 | Johns et al. | 705/319 |

FOREIGN PATENT DOCUMENTS

WO WO0010130 2/2000

OTHER PUBLICATIONS

Avatars in Analytical Gaming, Cowell, A.J.; Cowell, A.K.; Computational Science and Engineering, 2009. CSE '09. International Conference on vol. 4 Digital Object Identifier: 10.1109/CSE.2009.448 Publication Year: 2009 , pp. 1174-1179.*

Research on Intelligent Knowledge Push System Based on Rule Engine: A Case of Medical Training, You-Zhi Xu; Ji-Jiang Yang; Qing Wang; Hui Pan; Information Engineering and Computer Science, 2009. ICIECS 2009. International Conference on Digital Object Identifier: 10.1109/ICIECS.2009.5365490 Publication Year: 2009 , pp. 1-4.*

Freshness of Web search engines: Improving performance of Web search engines using data mining techniques, Kharazmi, S.; Nejad, A.F.; Abolhassani, H.; Internet Technology and Secured Transactions, 2009. ICITST 2009. International Conference for Publication Year: 2009 , pp. 1-7.*

(Continued)

*Primary Examiner*—Michael Holmes
(74) *Attorney, Agent, or Firm*—Toussaint L. Myricks

(57) ABSTRACT

A system operative to execute and train at least one avatar for each user of an interactive environment comprising a knowledge engine operative to continuously monitor each user's response to events in the interactive environment while each user controls the at least one avatar, a knowledge base operative to store each of the monitored user responses to events in the interactive environment and an action engine operative to control one or more actions of the at least one avatar for each user in the interactive environment based on the stored monitored responses regardless of each user's control of the at least one avatar.

97 Claims, 14 Drawing Sheets

OTHER PUBLICATIONS

Knowledge based system for weather information processing and forecasting, Siddiqui, K.J.; Nugen, S.M.; Geoscience and Remote Sensing Symposium, 1996. IGARSS '96. 'Remote Sensing for a Sustainable Future.', International vol. 2 Digital Object Identifier: 10.1109/IGARSS.1996.516580 Publication Year: 1996 , pp. 1099-1101 vol. 2.*

* cited by examiner

SYSTEM AND METHOD FOR CONTROL AND TRAINING OF AVATARS IN AN INTERACTIVE ENVIRONMENT

FIELD

The present disclosure relates generally to information processing, and in particular but not exclusively, relates to a system and method for control, training and autonomous execution of one or more avatars in an interactive environment.

BACKGROUND

In recent years, the development of new and powerful computing platforms has enabled more powerful computer simulations and computer games to be developed which enable users to engage a wide variety of simulated activities. These computing platforms have also begun to incorporate various forms of artificial intelligence that can enhance a user's experience in an interactive computer environment. Among the range of applications provided by advanced computing platforms are those that include the use of one or more automated personas and intelligent agents. These personas or agents have come to be referred to in certain instances as "avatars" because they may be portrayed in interactive environments with various human-like features.

Research directed to the control and autonomous operation of intelligent agents in an interactive environment has produced mixed results. A significant degree of research work has been performed to thoroughly understand the mechanics of human motion that can be rendered in a computer generated environment, but such research has provided little assistance in defining the features, methods or techniques to be used to enable these intelligent persona to effectively operate autonomously within an interactive environment regardless of a human user's direct control of the personas. Indeed, research into the most pioneering forms of artificial reasoning is still very much in a nascent stage and little is understood about how to effectively capture, analyze, build associative networks based on a user's past and present behaviors, and apply stored knowledge that is organized in the form of content and related meta-data associative networks to enable the rapid organization, searching and application of such knowledge to the real-time autonomous operation of intelligent personas in an interactive environment.

Thus, there is a current and pressing need for systems and methods that can provide continuous monitoring of events, actively monitor user responses to those events, and apply controlled actions to intelligent persona in a variety of interactive environments regardless of a user's direct involvement in controlling such persona in these environments.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 is a block diagram illustrating the components of a knowledge engine in an embodiment.

DETAILED DESCRIPTION

In the description to follow, various aspects of embodiments will be described, and specific configurations will be set forth. These embodiments, however, may be practiced with only some or all aspects, and/or without some or these specific details. In other instances, well-known features are omitted or simplified in order not to obscure important aspects of the embodiments.

Various operations will be described as multiple discrete steps in turn, in a manner that is most helpful in understanding each disclosed embodiment; however, the order of description should not be construed as to imply that these operations are necessarily order dependent. In particular, these operations need not be performed in the order of presentation.

The description repeatedly uses the phrases "in one embodiment", which ordinarily does not refer to the same embodiment, although it may. The terms "comprising", "including", "having", and the like, as used in the present disclosure are synonymous.

Figure 1:
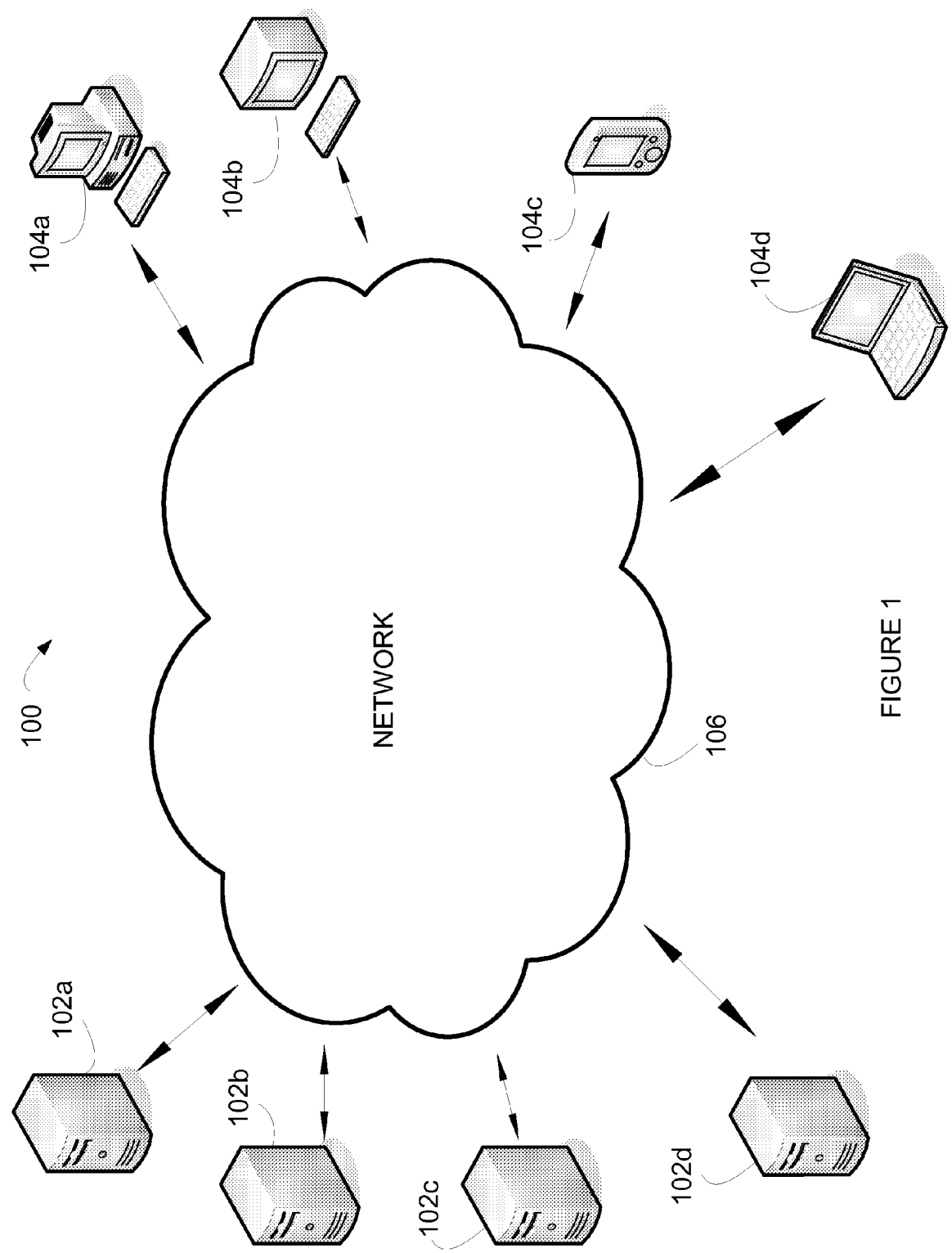
FIG. 1 is a block diagram illustrating network connectivity between servers and a various client devices in an embodiment.

FIG. 1 illustrates a system 100 comprised of a plurality of client devices 104*a*-104*d*, a network 106 and a plurality of servers 102*a*-102*d*. Various client devices 104*a*-104*d* may be included in the system for interactive computing and communications between and among the server devices 102*a*-102*d*. Client device 104*a* represents a personal computer, client device 104*b* represents a video gaming station, such as a Microsoft Xbox, Microsoft Xbox 360 or Nintendo play station. Client device 104*c* represents a handheld device such as a personal digital assistant or any of a variety of handheld gaming devices, such as a Sony PlayStation or Nintendo Game Boy, and client device 104*d* represents a portable computer. Network 106 included in the system 100 may be any of a number of networks including a local area network, a wide area network, the Internet, a wireless network or a combination of networking systems including wired, wireless and optical communication channels and devices.

Figure 2:
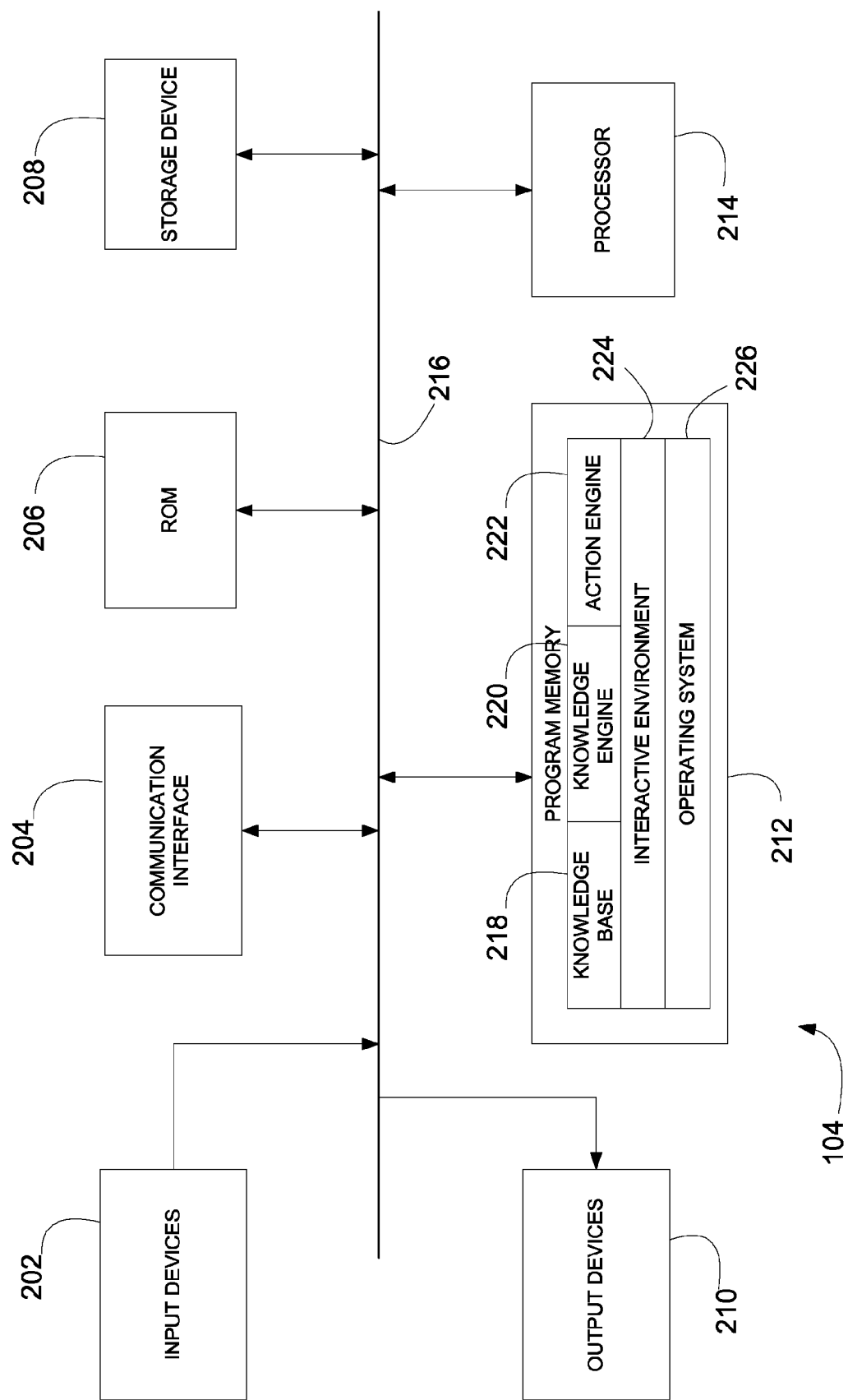
FIG. 2 is a block diagram illustrating a standalone client device in an embodiment.

FIG. 2 illustrates a client device 104 in a standalone embodiment. As shown, client device 104 includes one or more input devices 202, a communication interface 204, a Read Only Memory 206, a storage device 208, a central processing unit 214, one or more output devices 210 and a program memory 212. The one or more output devices 210 can be desktop computer monitors, the displays of laptop computers, the displays of mobile and handheld devices, or the cathode ray tube displays of televisions that are coupled to computer gaming devices (e.g., Xbox, Xbox 360, etc.). Each of these modules is communicatively coupled to communication bus 216 for inter-module communication. Program memory 212 includes several program components, which components comprise a software-implemented system to be used for monitoring user responses and events in an interactive environment and for controlling the actions of one or more avatars in the interactive environment. As shown in this figure, the program memory 212 includes a knowledge base 218, a knowledge engine 220, an action engine 222, an interactive computer-generated environment 224, and an operating system 226. Central processor 214 interacts with program memory 212 by sending commands and receiving data from program memory 212 over communication bus 216.

In a stand-alone embodiment such as the one depicted in FIG. 2, a game station such as a Sony PlayStation® or Nintendo GameBoy® (client device 104b) includes knowledge engine 220 to continuously monitor events in the interactive environment 224 and to monitor the user responses to those events in the interactive environment 224. Knowledge engine 220 actively analyses, associates and categorizes the user responses and stores those categorized associations among user responses in knowledge base 218. In the software-implemented system, one or more avatars may be controlled by a human user in the interactive environment 224. However, the knowledge engine 220 actively monitors each user's response in order to build a knowledge base of associations between responses and events which represent the range of user responses to the myriad events occurring in the interactive environment 224. The actual control of an avatar's action in the interactive environment 224 is performed by action engine 222 upon issuance of requests by knowledge engine 220.

Figure 3:
FIG. 3 is a block diagram illustrating the components of an action engine in an embodiment.

FIG. 3 illustrates several components comprising action engine 222. These components are common to each of the alternative embodiments of the software-implemented system. In the specific instance of the standalone alone, as shown, subscriber registration component 302 is used for registering each new subscriber or user to enable a registered user to activate and use one or more avatars in the interactive environment 224. Avatar activation component 304 is used to activate each new avatar to be used in the in the interactive environment 224 by a registered user. Only registered users are permitted to activate avatars for operations in the interactive environment 224. Action execution component 306 is responsible for controlling the actions of avatars in the interactive environment 224 based on one or more requests from knowledge engine 220. The actions performed by action execution component 306 are based on one or more control rules stored in avatar control rules database 308. Database 308 represents a repository of rules for controlling the actions of avatars in the interactive environment 224. Knowledge engine interface 310 is the communication interface between knowledge engine 220 and the action engine 222 and it is used to receive requests from knowledge engine 220 for execution by action execution component 306. These requests are implemented by one or more control rules stored in the avatar control rules database 308.

A particularly important aspect of the software-implemented system is that the action engine may be implemented as an artificial intelligence engine relying upon one or more expert systems, neural networks or other forms of computational intelligence. However, such artificial intelligence engines are necessarily directed by the issuance of requests by the knowledge engine 220. Knowledge engine 220 is integrated with and actively searches the repository of stored associations between events and user responses to determine what actions should be implemented by an avatar when operating in an autonomous operational mode in the interactive environment 224. Requests are issued by the knowledge engine 220 to ensure that the action execution component 306 in the action engine 222 implements actions based on requests which are ultimately based upon previously determined patterns of user responses to events in the interactive environment 224. In this manner, the autonomous actions of one or more of a user's avatars in the interactive environment 224 will most accurately mimic the user's responses with the user is not actively controlling the one or more avatars in the interactive environment 224.

FIG. 4 represents the components provided in knowledge engine 220. Although reference is made to the knowledge engine 220 in the standalone embodiment, each such component may be included along with all of the other components, or in various operational combinations including fewer of the specified components. In the present embodiment, knowledge engine 220 includes event monitoring component 402, response monitoring component 404, avatar mode management component 406, pattern analysis component 408, categorization component 410, knowledge based controller 412 and action engine controller 414. Event monitoring component 402 continuously and actively monitors events occurring in the interactive environment 224. More specifically, event monitoring component 402 monitors events in the interactive environment 224 and interoperates with response monitoring component 404 to enable pattern analysis component 408 to form associations between events and user responses as well as categories of user responses according to one or more metrics. These associations among events are stored in knowledge base 218 for later searching and a generation of action requests. Response monitoring component 404 continuously monitors user responses to the monitored events in the interactive environment 224.

The following is a representative listing of metrics that can be applied by categorization component 410 to the monitored user responses. This list is not exhaustive and is provided herein solely for the purpose of illustrating a representative sample of metrics for application by a knowledge engine in the various embodiments discussed herein. In alternative embodiments, subsets of the listed metrics may be used for user response categorizations, while in other embodiments different or additional metrics may be applied.

| USER RESPONSE | PERFOR-MANCE | DECISION | EMOTION |
| --- | --- | --- | --- |
| jump over object | | X | |
| go around object | | X | |
| use stealth | | X | |
| choice of weapons | | X | |

-continued

| USER RESPONSE | PERFOR-MANCE | DECISION | EMOTION |
|---|---|---|---|
| use of tactical options | | X | |
| help a team member | | X | X |
| disregard for personal safety | | X | X |
| rude behavior unrelated to game play | | | X |
| navigation skill | | X | |
| ability to understand choices | | X | X |
| ability to perceive best route to objective | | X | X |
| marksmanship | X | | |
| steering | X | | |
| completing a jump | X | | |
| time to make a decision | X | | |
| time to push necessary button | X | | |
| time to respond to stimuli | X | | |
| sportsmanship | | X | X |
| moral decision making | | X | X |
| height of jump or leap | X | | |
| average number of successful jumps | X | | |
| average number of kills | X | | |
| use of speed | X | | |
| driving skills | X | | |
| punching skills | X | | |
| swordsmanship | X | | |
| learn rate | X | | |
| unusual choices against known data | | X | X |
| unusual choices against known stimuli | | X | X |
| sacrifice to further team objectives | | X | X |

Interactive environment 224 is a computer-generated environment for use in executing computer simulations or computer video games in which various computer-generated events, or events created by other users active in the interactive environment 224, may occur. These events may trigger or require responses from one or more of a user's avatars when these avatars are operating in an autonomous mode, an assisted duality mode or a competitive duality mode. Avatars can be controlled by users of the client devices 104a-104d or can be executing autonomously or independently of the log-in status of a registered user.

Avatar mode management component 406 regulates the control of the avatars based on the operational mode of the interactive environment 224. Each registered user can have one or more avatars for execution in the interactive environment 224; however, the operation of these avatars can vary depending on the operational mode of the interactive environment 224. When a user is not actively logged into the interactive environment 224, the registered user's avatar(s) will still be capable of operating in the interactive environment 224 and responding to events monitored by event monitoring component 402 in an autonomous mode. In a real user mode, each avatar is directly controlled by a registered user whose responses to events in the interactive environment 224 will be monitored by response monitoring component 404. User responses are the basis of actions performed by avatars in an autonomous mode. A stored profile or history of user response included in knowledge base 218 are evaluated by knowledge engine 220 when requests are generated and issued to action engine 222 to have specific actions implemented and executed by avatars under the control of the action engine 222.

Pattern analysis component 408 applies pattern analysis techniques based in part on methods that determine the frequency of occurrence of certain user responses to monitored events. These techniques also apply certain statistical relevance ranking and correlations between and among user responses to determine patterns in user responses to monitored events. Pattern analysis component 408 forms associations between monitored events and one or more user responses to the monitored event. These associations are determined in real-time and are updated in a dynamic manner based on information compiled by response monitoring component 404.

After association of user responses to events, the user responses will be categorized according to one or more metrics by categorization component 410. Among the specific metrics used for categorizing user responses are performance metrics, decision metrics and emotion metrics. Emotion metrics are based in part on the performance metrics and the decision metrics. Among the various types of performance metrics are timing measures for each user response monitored by response monitoring component 404 each of which is based on one or more events monitored by event monitoring component 402.

Categorization component 410 evaluates user responses and categories them according to applicable metrics. For instance, in a competitive boxing video game, knowledge engine 220 will actively monitor the action taken by a user in response to an event (e.g., a jab from a competing avatar to the face) and continuously analyze the user's response to similar events in the interactive environment 224. The collective set of user responses to different monitored events will be correlated and categorized according to statistical techniques in order to identify the timing of responses to specific events, the types of responses to specific events and the frequency with which similar responses occur in the presence the same or similar events in the interactive environment 224. These categorized responses provide an independently searchable dataset for the knowledge engine 220 in addition to the searchable associations among events and responses. Furthermore, the nature of a user response to an event will be evaluated by categorization component 410 to deduce an emotion metric associated with each response. Thus, component 410 will also enable the knowledge engine 220 to issue requests to action engine 222 that will enable the actions of an avatar operating in an autonomous mode to mimic the emotional character of a registered user's response to certain monitored events. The timing performance of user responses are categorized by categorization component 410 as "performance metrics," while the type of response to specific events is categorized by component 410 as a "decision metric."

Knowledge base controller 412 controls the reading and writing of "associations" represented as diverse forms of abstract data types and related operators. These associations are stored and retrieved based on the associations created by pattern analysis components 408. Action engine controller 414 controls the transmission of requests to action engine 222 to enable explicit actions of an avatar to be implemented by the action engine 222 based on specific monitored user responses, as monitored by response monitoring component 404, or actions requested by pattern analysis component 408 and categorization component 410 when one or more avatars in the interactive environment 224 are operating in an autonomous mode, or when a user is not actively logged-in, or taking action in response to events occurring in the interactive environment 224.

Figure 5A:
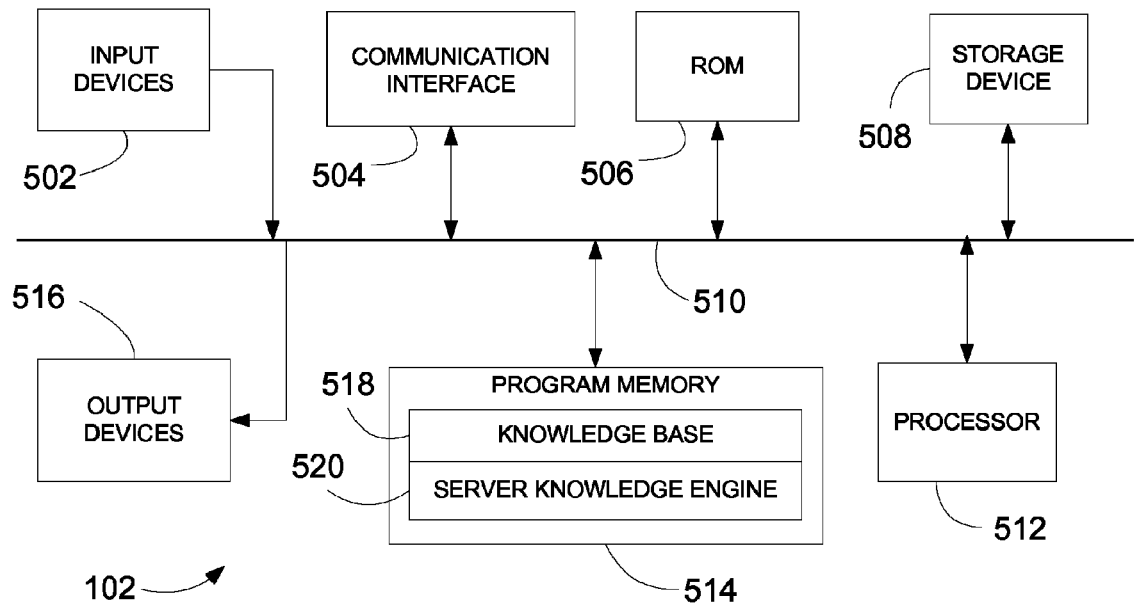
FIG. 5A is a block diagram illustrating the components of a server device in an embodiment.
Figure 5B:
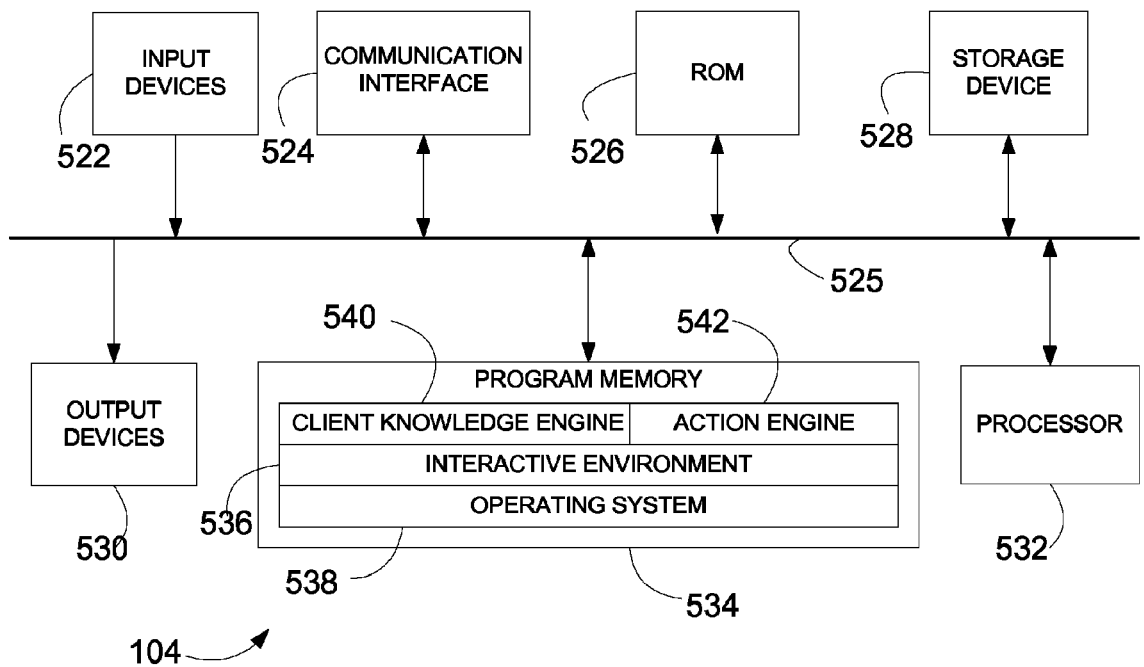
FIG. 5B is a block diagram illustrating the components of a client device in an embodiment.

FIGS. 5A and 5B depict alternative embodiments of the software-implemented system in a client/server configuration. In particular, these figures represent client devices 104 and server devices 102. FIG. 5A represents a server device 102 comprising one or more input devices 502, a communication interface 504, a read only memory 506, a storage device 518, a processor 512, a program memory 514 and one or more output devices 516. Each of these components of the server device 102 is communicatively coupled to communication bus 510. Program memory 514 includes a knowledge base 518 and a server knowledge engine 520. Server knowledge engine 520 continuously monitors and analyses user responses and forms associations between events monitored by client knowledge engine 540 in the interactive environment 536 and the user responses. Knowledge engine 520 also applies processes to categorize user responses according to various metrics, including a decision metric, a performance metric and an emotion metric. Knowledge based 518 stores associations between monitored events and monitored user responses and permits the organized storage of the associated events and responses according to the categories in which user responses have been categorized based on the applicable metric (i.e., decision, performance or emotion).

FIG. 5B illustrates a client device 104 comprised of one or more input devices 522, a communication interface for communicating to and from server device 102, as illustrated in the FIG. 5A, a read only memory 526, a storage device 528, a processor 532, a program memory 534 and one or more output devices 530. Each of these components is coupled to communication bus 525 to facilitate inter-component communication. Program memory 534 includes a client knowledge engine 540, an action engine 542, an interactive environment 536 and an operating system 538. Each of the components included in program memory 534 are used by processor 532 for execution of the interactive environment 536. The interactive environment 536 is a computer-generated environment that controls the autonomous execution of computer-generated events. In an embodiment the interactive environment 536 is a computer-generated simulation environment, while on a different embodiment the interactive environment 536 is a computer-generated video game environment. Client knowledge engine 540 continuously monitors events in the interactive environment 536 and user responses to those events when a registered user is logged-in and actively responding to events in the interactive environment 536. Client knowledge engine 540 compiles a profile of the user responses and actively reports those responses to server knowledge engine 520 for analysis, association and categorization. User responses are categorized by several different metrics, including a decision metric, a performance metric and an emotion metric. After categorization, the responses are stored in knowledge base 518 according to one or more associations and applicable metrics.

Figure 6A:
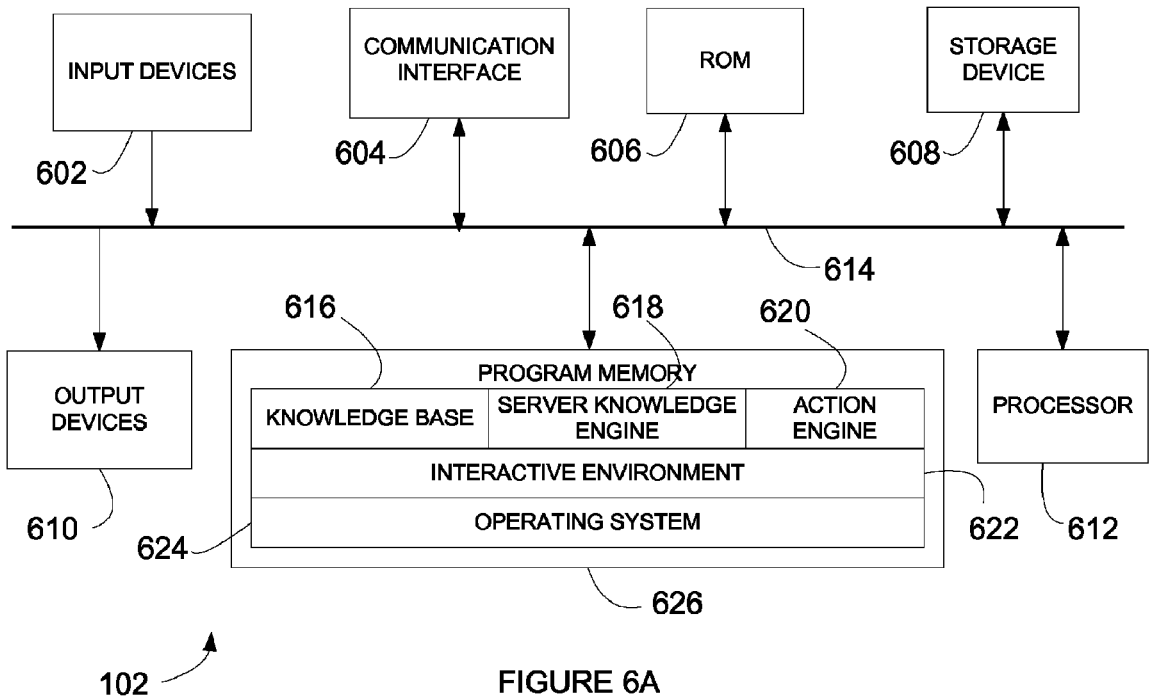
FIG. 6A is a block diagram illustrating the components of a server device in an embodiment.
Figure 6B:
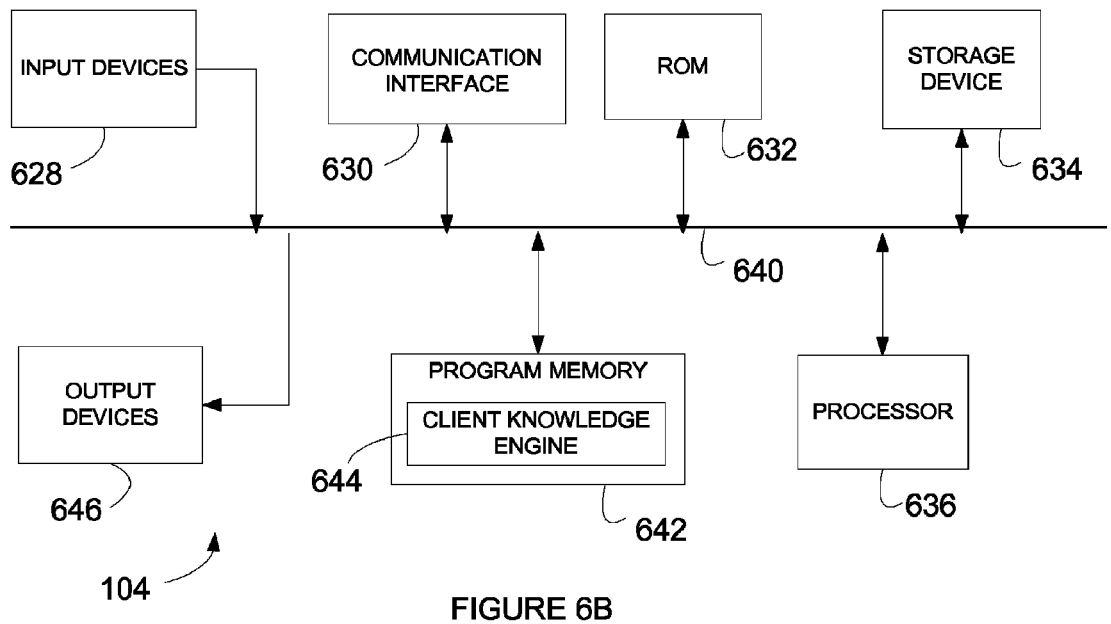
FIG. 6B is a block diagram illustrating the components of a client device in an embodiment.

FIG. 6 illustrates an alternative client/server embodiment for the software-implemented system. In particular, this embodiment includes one or more server devices 102a-102d (FIG. 6A) and one or more client devices 104a-104d (FIG. 6B). Server device 102 includes one or more input devices 602, a communication interface 604 for sending and receiving communications with one or more client devices 104, a read only memory 606, a storage device 608, a processor 612, a program memory 626 and one or more output devices 610. Included in program memory 626 are a knowledge base 616, a server knowledge engine 618, and an action engine 620. Server knowledge engine 618 directs the actions of action engine 620 by issuing requests that are translated into a specific actions performed by avatars under the control of the action engine 620. Server knowledge engine 618 interacts with interactive environment 622, which is executed by operating system 624, to monitor events occurring in this environment 622. Processor 612 interacts with program memory 626 for execution of operations performed by server knowledge engine 618 and action engine 620 and for rapid search, storage and retrieval of associations and rapid searching and evaluation of user responses according to categorized metrics. Each of the components in the server device 102 is communicatively coupled via communication bus 614.

In the embodiment depicted in FIGS. 6A and 6B, server knowledge engine 618 and client knowledge engine 644 actively interoperate to monitor user responses to events occurring in the interactive environment 622. User responses are monitored on client device 104 by client knowledge engine 644, which is store in a local program memory 642. As shown in FIG. 6B, client device 104 includes one or more input devices 628, a communication interface 630, a read only memory 632, a storage device 634, a processor 636, program memory 642 and one or more output device 646. These components are communicatively coupled to each other over communication bus 640. In this embodiment, users respond to events in the interactive environment 622 by taking action (e.g., moving joysticks, touching portions of a touch screen, etc.) on an input device 628 of the client device 104 and these responses are actively and continuously monitored by client knowledge engine 644. Although client knowledge engine 644 monitors user responses on the client devices 104, in this embodiment the record of monitored responses is communicated to server knowledge engine 618 for analysis of responses and events, the forming of associations between responses and events, and the categorization of user responses according to specific metrics. In an embodiment, interactive environment 622 executes on a server device 102. In an alternative embodiment, the interactive environment 622 is executed on a plurality of servers, each having an independent though cohesive role in managing the execution of events in the interactive environment 622 to which registered users and autonomously executing avatars may respond. Server knowledge engine 618 analyzes the user responses received from client devices 104, associates each user response to a monitored event in the interactive environment 622, and categorizes user responses according to at least one decision metric, a performance metric and an emotion metric.

The metrics applied in this system represent various timing measures related to user responses (i.e., performance metrics) and various outcomes of certain user responses to monitored events in interactive environment 622 (i.e., decision metrics). In addition to performance metrics and decision metrics into which various user responses may be categorized, the user responses can also be categorized according to an emotion metric. An emotion metric is based on one or more performance metrics and decision metrics and is a composite metric that is determined by server knowledge engine 618 and associated with the responses to related events. These associations are used in an autonomous mode to control the actions of one or more avatars associated with the registered user to enable the actions of the avatar to be performed in a manner consistent with past user responses of the user. In essence, server knowledge engine 618 enables the active, ongoing and continuous profiling of user responses, and the association and categorization of those responses for the purpose of determining and applying actions using an avatar in an autonomous operating mode that are consistent with the responses and related emotions associated with those responses that were displayed by a user when that user was logged-in and responding to events in the interactive environment 622.

Figure 7:
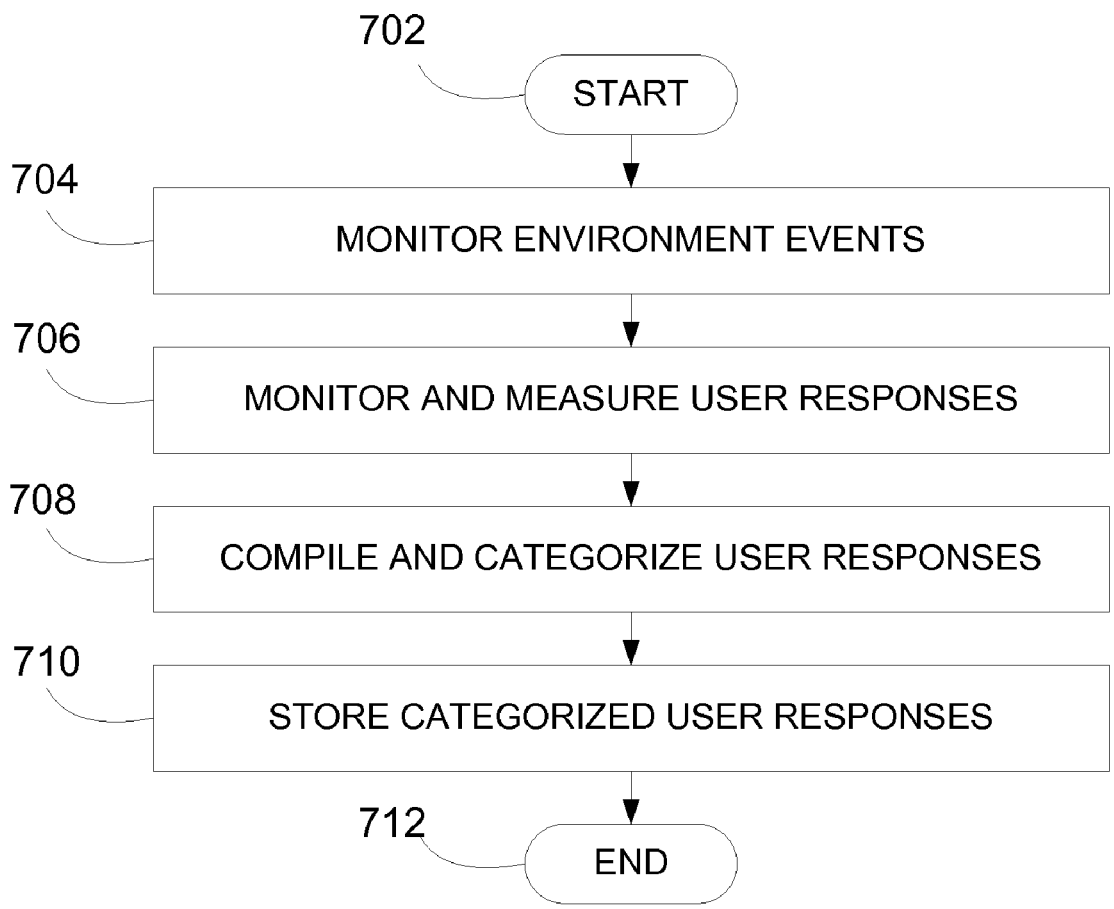
FIG. 7 is a flow diagram illustrating a method for monitoring, categorizing and storing user responses in an embodiment.

FIG. 7 illustrates a flowchart outlining a process for monitoring and controlling avatars in an interactive environment. This process commences at step 702 and proceeds with the monitoring of events in an interactive environment, as shown in step 704. While monitoring events in the interactive environment, user responses to these events will be monitored and measured, as shown as step 706, and these user responses will be compiled, analyzed and categorized according to one or more performance metrics, decision metrics and emotion metrics, as shown as step 708. The categorized user responses will be stored, as shown as step 710, for later searching and use by a knowledge engine in formulating requests to control the actions of one or more avatars in the interactive environment while operating an autonomous mode. The avatars perform actions in the autonomous mode when the subscriber to whom the avatars have registered is not logged-in or actively responding to monitored events in the interactive environment. The process concludes, as shown at step 712, after the user responses are categorized and stored in a knowledge base.

Figure 8:
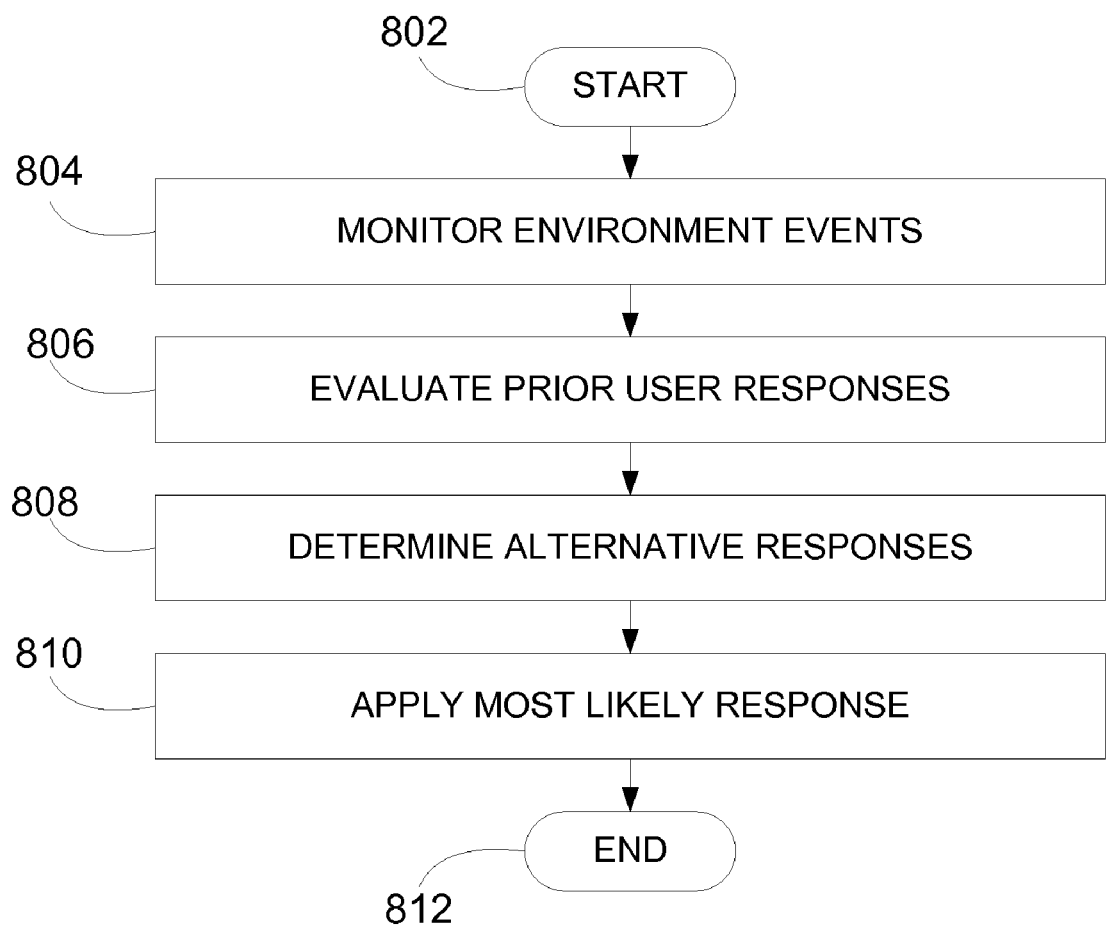
FIG. 8 is a flow diagram illustrating a method for evaluating user responses and controlling the actions of an avatar based on evaluated user responses in an embodiment.

FIG. 8 illustrates a process for applying a response based on previous user responses after a comparative evaluation of prior user responses. The process commences at step 802 with the monitoring of events in an interactive environment, as shown as step 804. A knowledge base storing prior user responses is searched and those responses will be evaluated and compared with a record indicated user responses to prior monitored events, as shown in step 806. In searching and evaluation prior user responses in a knowledge base, the knowledge engine will determine a set of most likely alternative user responses to specific monitored events, as shown as step 808 that can be applied by one or more avatars for a registered user. The set of most likely alternative responses to each monitored event will be determined by analyzing patterns in the responses to past events in the interactive environment and comparing in real-time those past events with the monitored events. One or more pattern analysis techniques can be applied, including techniques that analyze the frequency of occurrence of specific types of responses for type of previously monitored event. Statistical relevance ranking techniques can also be applied alone or in combination with a frequency of occurrence measure to determine the most likely response, or set of responses, to monitored events. Once a most likely response is determined, the selected response will be applied in the interactive environment by one or more avatars for a registered user, as shown at step 810, and the process will come to an end, as shown at step 812. Although the term "responses" as used here applies generally to the controlled actions of registered users in an interactive environment, this term is also intended to refer to the specific actions taken by avatars in this environment in the absence of direct, controlled activity by a user.

Figure 9:
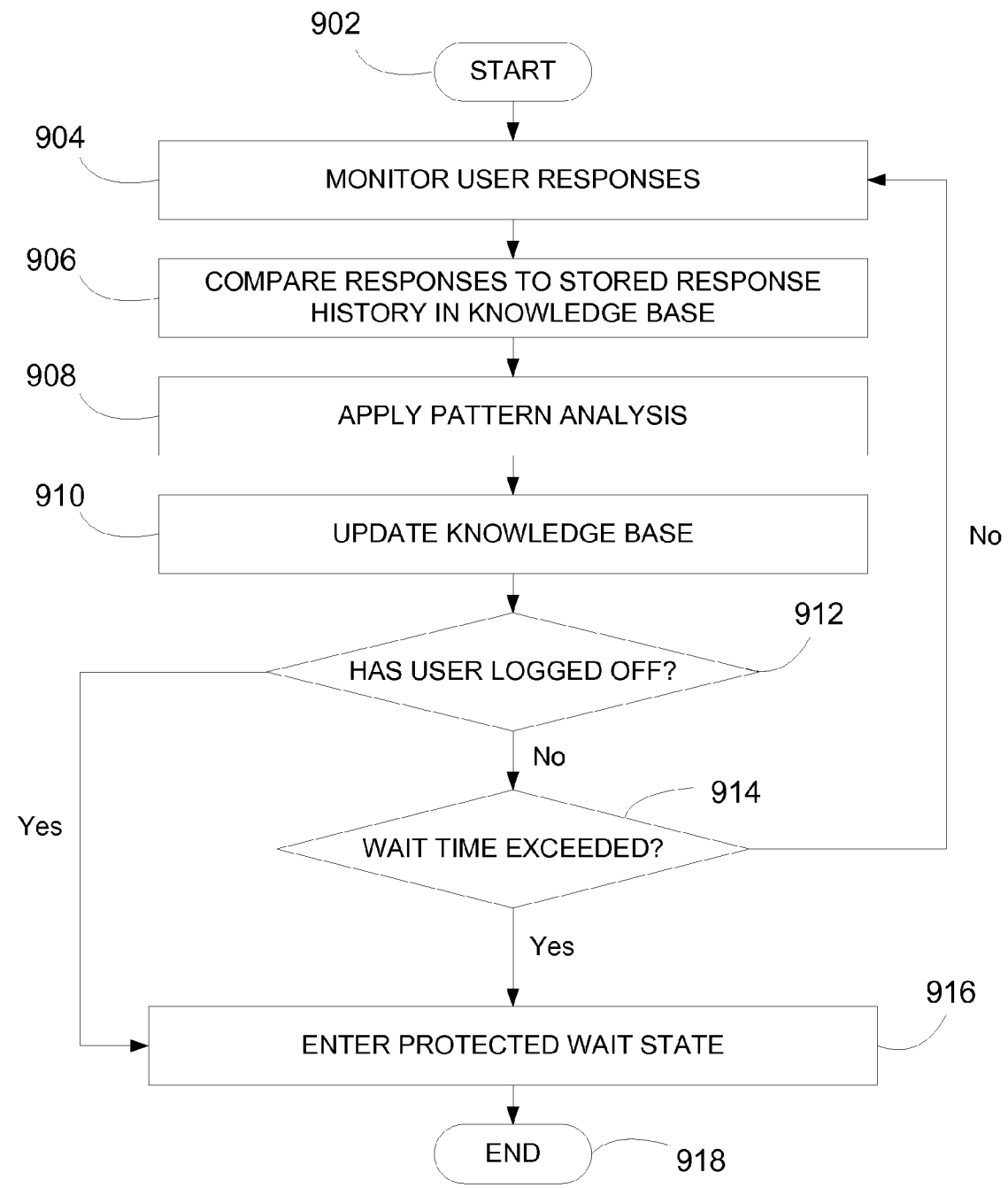
FIG. 9 is a flow diagram illustrating a method for applying pattern analysis to user responses in an embodiment.

FIG. 9 illustrates a process for monitoring user responses and determining when to enter a protected wait state. This process commences at step 902 with the monitoring of user responses (shown at step 904) and the comparison of each monitored response to stored responses in a knowledge base, as shown at step 906. One or more pattern analysis methods will be applied to the monitored user responses (shown at step 908) based on the comparisons performed in step 906. New user responses to similar previously monitored events will be associated with these events and stored to enable the knowledge base to be updated with an active, real-time record of associations between events and responses, as shown as step 910. After updating, the interactive environment will be monitored to determine if a user has logged off, as shown in step 912. If a user has not logged off, a wait time will be checked to determine whether the length of time between the occurrence of the last action performed by the user and the present time exceeds a wait time threshold for receiving a response from a user to a monitored event in the interactive environment, as shown in step 914. If the wait time has been exceeded, then the one or more avatars for a registered user will enter into a protected wait state in the interactive environment and await commands or requests to take actions from the user, as shown at step 916.

Alternatively, if the user has logged off, as shown in step 912, then the user's avatars will enter into the protected wait state in the interactive environment, as shown in step 916. If the time in which a user takes an action has not exceeded the wait time, as shown at step 914, then the user responses will continue to be actively monitored and compared to the record of stored responses in the knowledge base, as shown at step 906. This comparative real-time analysis of newly monitored responses with previously stored monitored responses continues while the interactive environment is active in order to continually identify, associate and categorize new and different responses to events in this environment, which analysis is shown at step 908. The updating of a knowledge base with associations of new user responses to events in the interactive environment is shown in step 910. If the user logs off, the protected wait state will be entered (step 916) and the process will end, shown at step 918.

Figure 10:
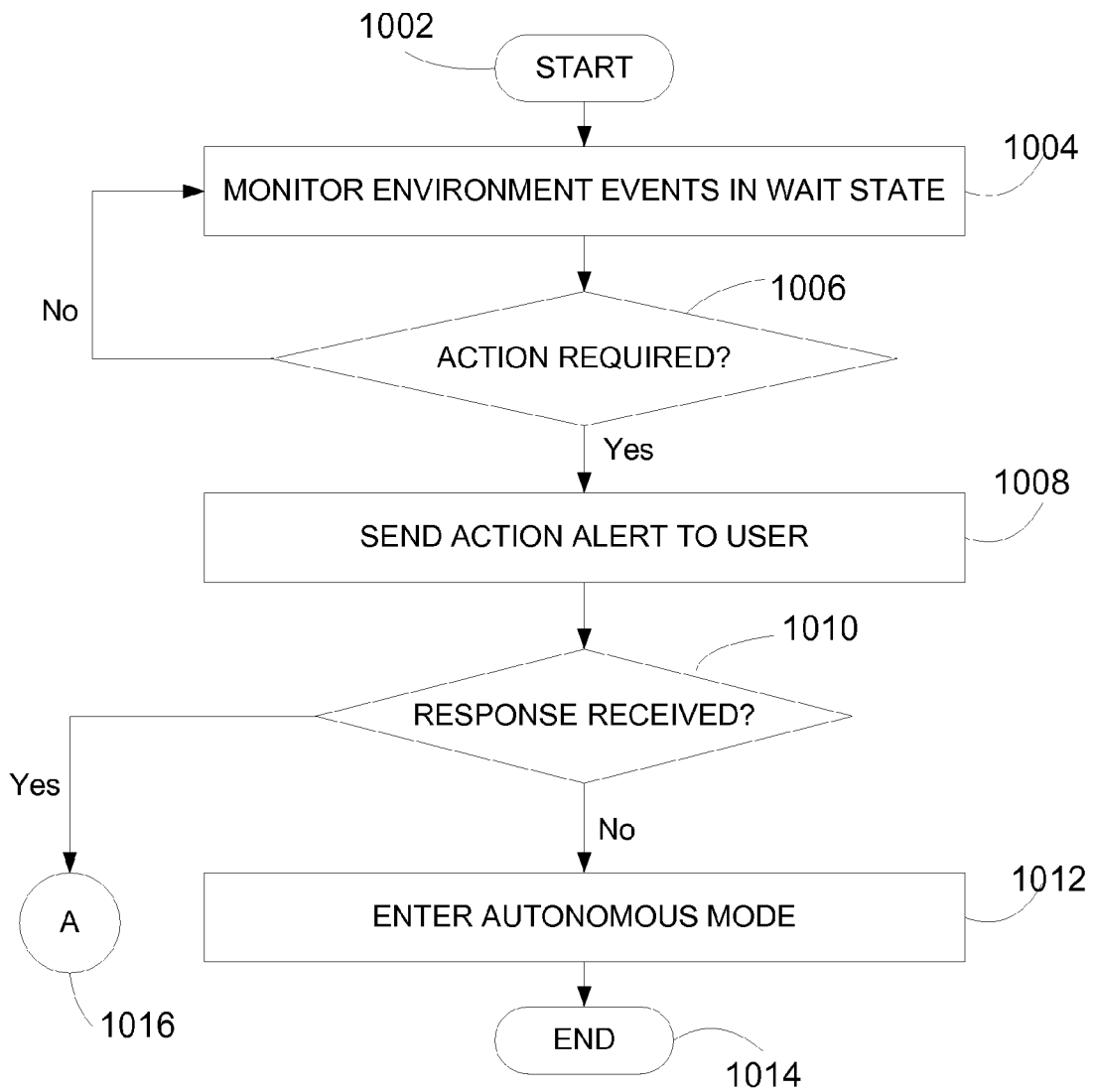
FIG. 10 is a flow diagram illustrating a method for alerting a user and monitoring user responses in an embodiment.

FIG. 10 depicts a process that enables an avatar to interact with a user when that user is not logged-in to an interactive environment. The process commences as step 1002 with the monitoring of events in an interactive environment while an avatar is in a protected wait state, as shown at step 1004. Depending on the monitored event, certain actions may be required by the avatar, as indicated by step 1006. If no action is required, the events in the interactive environment will continue to be monitored and the avatar will remain in the protected operational wait state. However, if action is required, an action alert will be sent to the, user as shown at step 1008, and the avatar await a response from the user, as shown at step 1010. If no response is received, then the avatar will enter into an autonomous operational mode, as shown at step 1012, which will enable each of the avatars of a registered user to interact with events in an interactive environment based on the collective record of associations between events and user responses which are stored in a knowledge base. The actions most likely to be applied will be determined from the knowledge base of stored associations and an action engine will be activated to explicitly control the execution of one or more actions of a user's avatar(s) based on the control rules stored in the avatar control rules database shown in FIG. 3. In this operational mode, a knowledge engine will send requests to the action engine based on the stored associations and continuously analyze the actions of avatars in response to monitored events in the interactive environment. The knowledge engine and the action engine will have exclusive control over the actions of each user's avatars in this mode. On the other hand, if a user response is received, as shown at step 1010, then the process will transition to the steps shown in FIG. 11, as discussed below.

Referring back to step 1008, an action alert can be issued by one or more of a registered users avatars in the form of electronic mail messages or telephone calls from each of the user's avatars in which a speech synthesized voice of an avatar describes the events in the interactive environment to the user. The electronic mail message, also referred to as an "Emergency Action Message," can include a request for specific user input to enable the avatar to take action in the interactive environment in response to an imminent event or threat.

Figure 11:
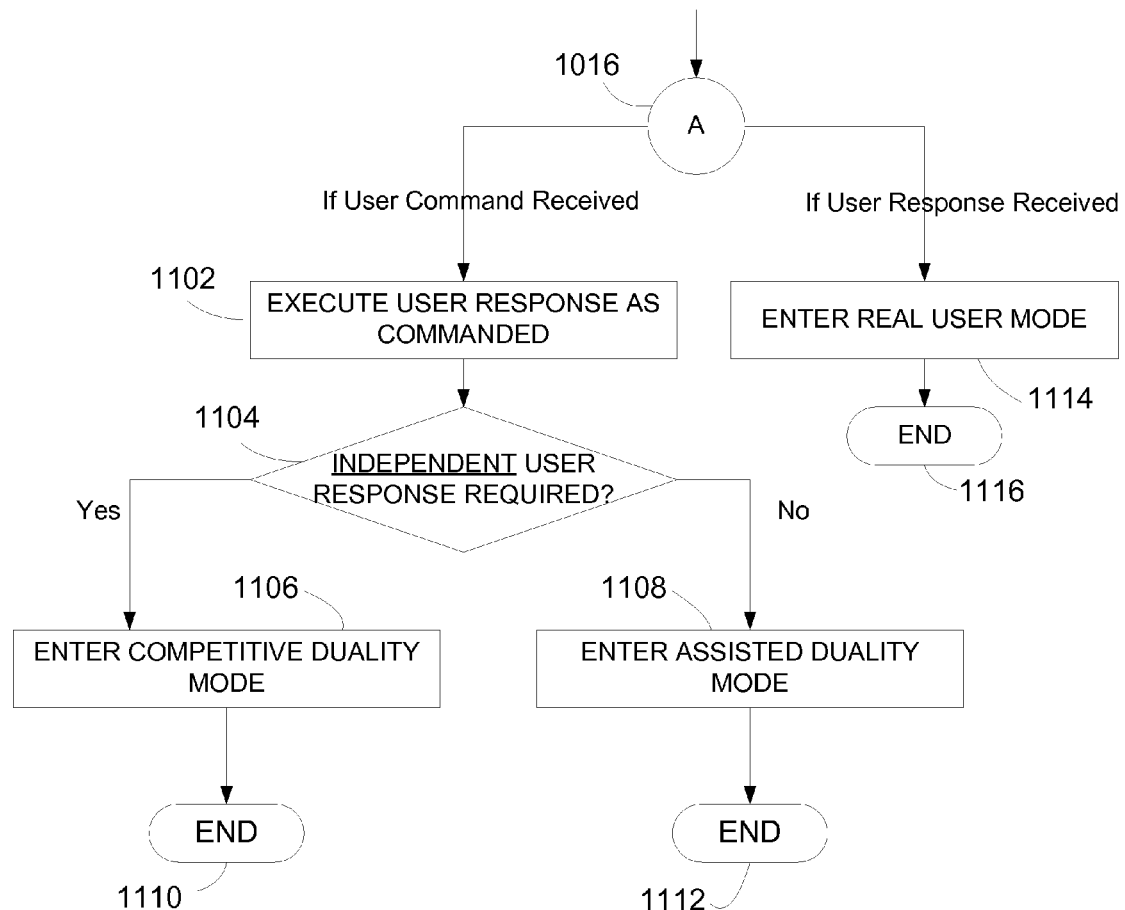
FIG. 11 is a flow diagram illustrating a method for controlling the operational mode of an interactive environment in an embodiment.

If a user responds to an action alert received on a telephone call with a command, the avatar will attempt to execute the command, as shown at step 1102 in FIG. 11. In processing the user response, a knowledge engine will determine whether an independent user response is required, as shown in step 1114. An independent user response will be required if the avatar that placed the action alert cannot perform an action specified in a received user command without independent user action in the interactive environment. In such instances, the operational mode of the avatars in the interactive environment will transition to a competitive duality mode, as shown at step 1106. In this operational mode, the avatars would engage in independent actions in the interactive environment that would be directly competitive with the actions of the user once the user returned to a logged-in status in this environment. In an alternative embodiment, a group of avatars may be controlled by the user and a collaborative team of avatars can be formed that engages in competitions as a team against the group controlled by the user. The group of user controlled avatars and the collaborative teams of avatars can also respond to events in the interactive environment competitively after the user returns to a logged-in status in the interactive environment.

In the alternative, if an independent user response is not required, then the user and the user's one or more avatars would respond to events in an interactive environment in an assisted duality mode (1108) in the interactive environment. The competitive duality mode is an operating mode in which user responses in an interactive environment actively compete against one or more actions of a user's avatars in the environment. In this case, both the avatars and the user will respond to monitored events in the interactive environment and to each other's actions in that environment. In the assisted duality mode, the user and the user's avatars operate in a collaborative fashion and the user's actions will supplement the independent actions of the user's avatars while those avatars respond to monitored events in an interactive environment.

Returning to FIG. 11, if a user response (i.e., a user action in the interactive environment) is received instead of a user command (i.e., an email or verbal directive to the avatar issuing the action alert), then the interactive environment will enter a real user operational mode, as shown at step 1114, and then return, as shown at step 1116. A user response involves a user logging into the interactive environment to take control of the one or more avatars in the interactive environment and to respond directly to monitored events in that environment.

Figure 12:
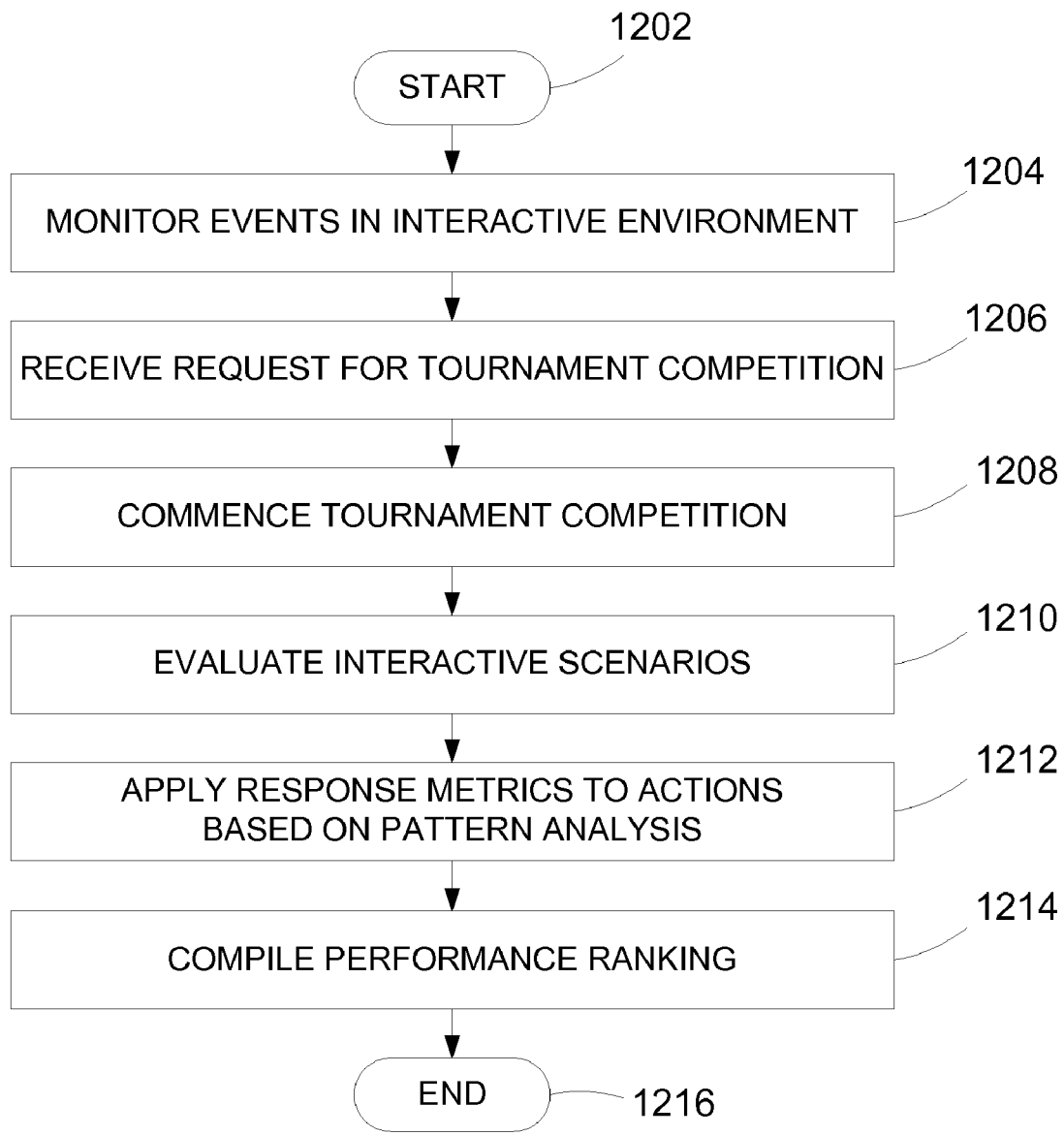
FIG. 12 is a flow diagram illustrating a method for autonomous operation of avatars in an interactive environment in an embodiment.

FIG. 12 illustrates a process for autonomous operation of avatars in an interactive environment. The process commences at step 1202 with the monitoring of events in an interactive environment, as shown at step 1204. In the autonomous operating mode, one or more avatars of each registered user continues to actively compete against the avatars of other registered users regardless of the user's log-in or control status of those avatars. Avatars can engage in competitions with individual avatars, or self-organize into collaborative teams of avatars for competitions against other groups of avatars or for competitions in response to monitored events in the interactive environment. In this operating mode, multiple servers can host the interactive environment to enable the avatars of all registered users to actively compete against each other for performance rankings in selected competitive events in the interactive environment. The competitive events may involve individual competition among avatars in response to actions of other avatars, competitive assessments of avatars in response to monitored events in the interactive environment, and the formation of collaborative teams of avatars which engage in competition or respond to monitored events as collaborative teams. These events may be held at prescheduled times and announced to all registered users as "World Olympic Avatar Competitions." Thus, requests for participation in such competitions can be received by registered users, as shown at step 1206. The requests are issued by administrators of the interactive environment in which the avatar competitions will be held.

Competition among the avatars of registered users who accepted the requests will commence, as shown at step 1208, and these avatars will take actions in response to events in an autonomous operational mode. The competitions involve multiple interactive scenarios requiring competitive interaction by one or more of each registered users' avatars against other competing avatars in an interactive environment. The performance of the avatars in the interactive scenarios will be evaluated and used to determine a competitive ranking, as shown at step 1210. The actions of the avatars in these autonomous mode interactive competitions are based in significant part on the associations between events and user responses stored in a knowledge base, and the categorization of these user responses according to selected metrics. A knowledge engine categorizes the user responses while the user actively controls and executes responses to events in the interactive environment. The categorization of user responses is based on specific performance metrics, decision metrics and emotion metrics. These metrics affect how avatars will apply actions in the interactive environment based while operating in the autonomous competition mode. More specifically, the actions applied by avatars in the autonomous competition mode are based on pattern analyses that are applied to user responses by the knowledge engine when those responses are initially made to monitored events in the interactive environment, as shown at step 1212. The knowledge engine operating in conjunction with an action engine will have exclusive control over the actions of avatars in this competition mode. Registered users can have active avatars perform actions in the autonomous mode or the autonomous competition mode for an indefinite time period. In an embodiment, the indefinite period can extend beyond the lifespan of a registered user. A performance ranking of the actions of the avatars will be compiled, as shown at step 1214, and a determination is made to determine which avatar scored the highest in an autonomous and fully hosted competition in the interactive environment. After compiling performance rankings for the avatars in the autonomous competition mode, the process ends, as shown in step 1216.

Figure 13:
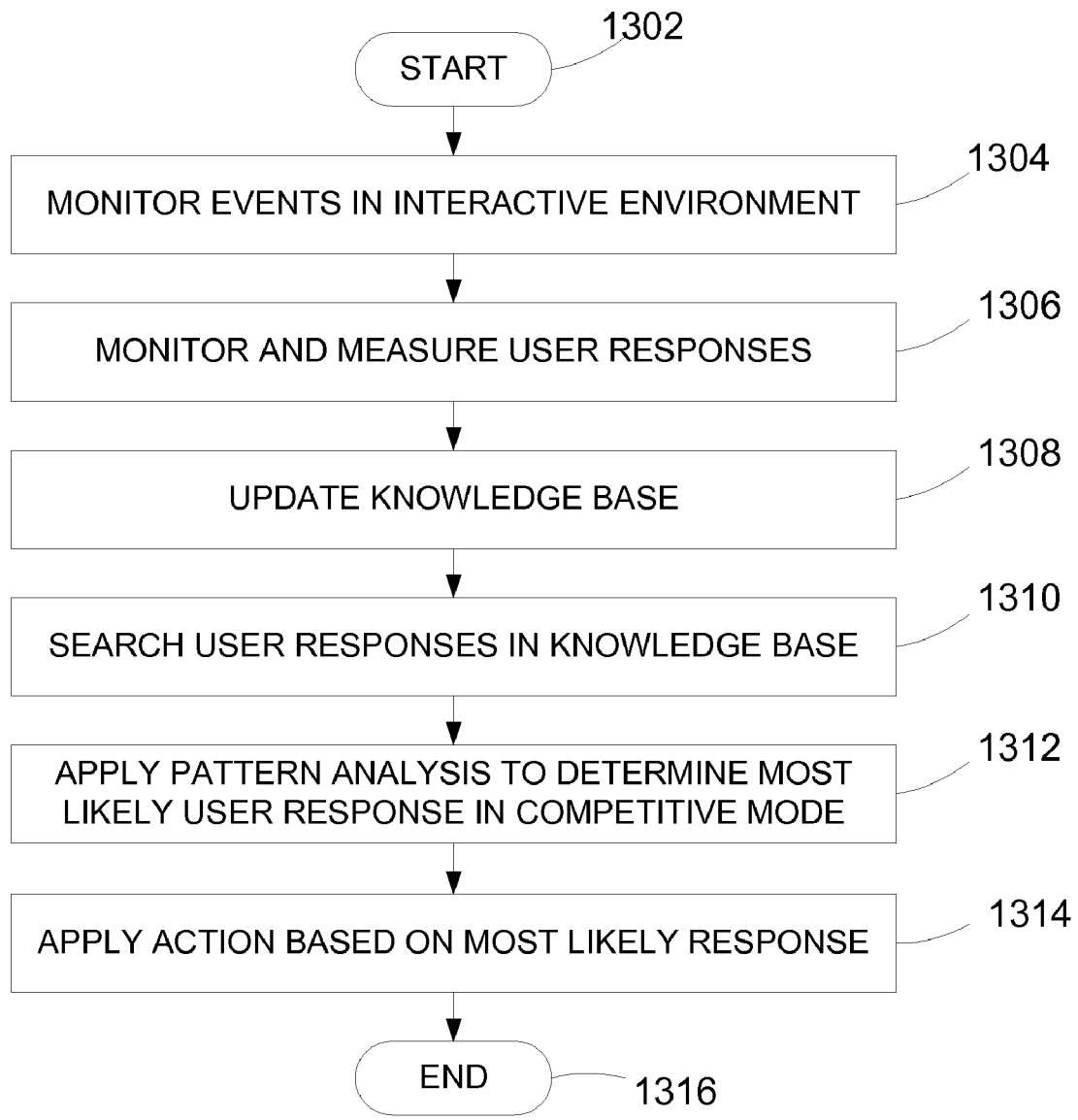
FIG. 13 is a flow diagram illustrating a method for determining actions for execution of avatars in a competitive operational mode of an interactive environment in an embodiment.

FIG. 13 illustrates an embodiment of a process for a competitive operational mode. In this mode, a registered user actively competes with one or more of the user's avatars in the interactive environment. This process commences at step 1302 with the monitoring of events in the interactive environment, as indicated at step 1304. User responses are monitored and measured according to various categorizes of metrics, including performance metrics, decision metrics and emotion metrics, and the responses are associated and categorized. The user responses are associated with the monitored event that caused the specific response and this association is stored in order to maintain an updated knowledge base, as shown in step 1308. After updating, in the autonomous mode the knowledge base will be searched according to collective associations of responses and events, in a manner similar to the storage of information in an associated form in the human brain.

In searching these associations for user responses to monitored events, as shown at step 1310, one or more pattern analysis techniques will be applied to determine the most likely user response in the competitive operational mode. As indicated above, in the competitive duality mode a user is active in an interactive environment but is pitted against one or more of its registered avatars who take action in response to the actions of the human user as well as automated events in the interactive environment, as shown at step 1312. A knowledge engine will actively search a knowledge base of stored user responses and issue requests based on the associations formed between monitored events and prior user responses for the purpose of controlling the actions of avatars in the interactive environment while continuously monitoring events in the environment.

The actions of the avatars are based on requests made by a knowledge engine to an action engine and these requests are based on real-time searching and identification of associations of user responses and prior monitored events. These associations enable the knowledge engine to readily determine what actions are necessary in response to monitored events. The applicable action is determined from statistical relevance measures, a frequency of occurrence measure or other applicable statistical measures that are applied to determine in real-time the most likely response a user would take in response to a monitored event. These responses would be applied by controlled actions regulated by the action engine for the purpose of directing one or more avatars in the interactive environment in a competitive operational mode, as shown in step 1314. After controlling avatar action based on the most likely user response, this process ends as shown at step 1316.

Figure 14:
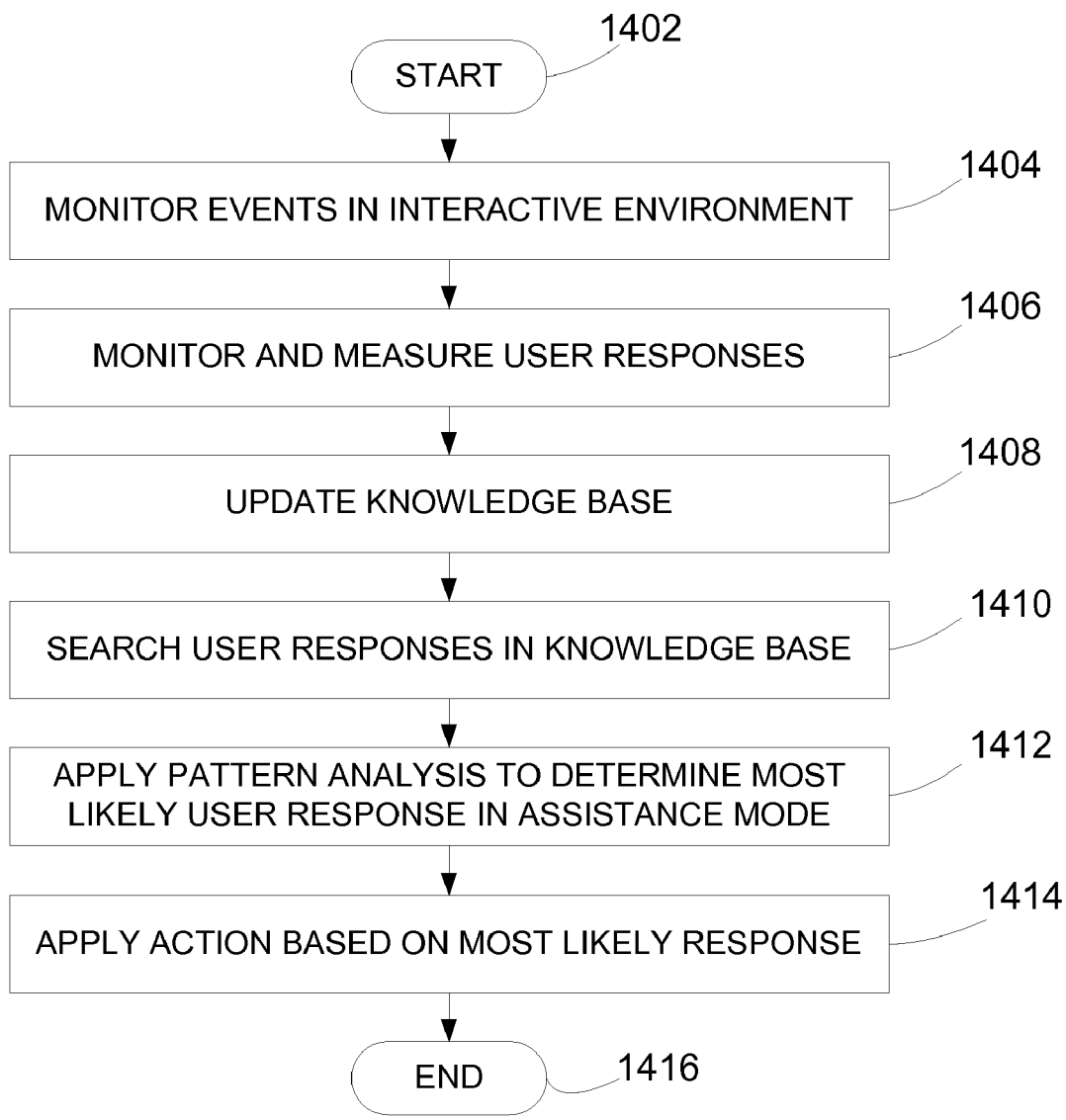
FIG. 14 is a flow diagram illustrating a method for determining actions for execution of avatars in an assisted operational mode of an interactive environment in an embodiment.

FIG. 14 illustrates a process for controlling the actions of an avatar in an assisted duality operational mode. At the commencement of this process, shown at step 1402, events in an interactive environment are continuously monitored, shown at step 1404, and the monitoring and measuring of user responses to these events is performed, as shown at step 1406. A knowledge base is continually updated with associations and categorizations of user responses as events in the interactive environment are continuously monitored, as shown as step 1408. The knowledge base is searched by a knowledge engine for user responses according to stored associations and categorizations, as shown at step 1410, and one or more pattern analysis methods are applied to determine the most likely user response to the monitored events in the interactive environment, which response will be applied by a user's avatars in the interactive environment in the assisted duality operational mode, shown at step 1412.

In the assisted duality operational mode, a user's avatar will monitor the actions of the user while that user actively controls the avatars in the interactive environment. In monitoring the user's actions to events in the interactive environment, a knowledge engine will continuously measure those actions, build associations between the user's actions to monitored events in the interactive environment, and categorize the actions according to performance metrics, decision metrics, and at least one emotion metric. In this context, the "actions" of a user are the "responses" made by the user to events occurring in the interactive environment. After the knowledge engine determines the most likely user response to be applied by an avatar in the assisted duality mode, an action engine will cause the avatar to execute an action, which action will based on the most likely user response to the monitored event in the interactive environment, as shown in step 1414. After application of an action based on the most likely response, the process ends, as shown at step 1416.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein.

What is claimed is:

1. A system operative to execute and train at least one avatar in an interactive environment for each of one or more users, the system comprising:
   a plurality of client devices coupled to a network, each client device including at least a first knowledge engine operative to continuously monitor each user's response to a plurality of events in the interactive environment, the first knowledge engine including an event monitoring component, a response monitoring component and an operational mode management component; and
   at least one server device coupled to the network including a memory, a knowledge base and a second knowledge engine, the second knowledge engine including a pattern analysis and recognition component, a categorization component and a knowledge base interface controller, the at least one server device operative to receive the monitored user responses from the first knowledge engine and to cause the at least one avatar to execute one or more actions in the interactive environment based on pattern analysis of the monitored user responses.

2. The system of claim 1 wherein each of the plurality of client devices further includes an action engine, the action engine operative to control the execution of the one or more actions of the at least one avatar in the interactive environment based on the monitored user responses.

3. The system of claim 1 wherein the at least one server device further includes an action engine, the action engine control operative to control the execution of the one or more actions of the at least one avatar in the interactive environment based on the monitored user responses.

4. The system of claim 1 wherein the interactive environment is a computer-generated simulation environment.

5. The system of claim 1 wherein the interactive environment is a computer-generated game environment.

6. The system of claim 1 wherein the event monitoring component is operative to continuously monitor events in the interactive environment and to report the monitored events to the second knowledge engine, the response monitoring component is operative to continuously monitor each user's responses to the plurality of events in the interactive environment and to report each monitored user response to the second knowledge engine, and the operational mode management component is operative to determine the actions of the at least one avatar in an operational mode in the interactive environment, the operational mode being one of a real user mode, an assisted duality mode, a competitive duality mode and an autonomous operational mode.

7. The system of claim 1 wherein the second knowledge engine further includes an action engine controller, the knowledge base interface controller operative to communicate between the pattern analysis and recognition component and the categorization component, the action engine interface controller operative to communicate requests for control actions to an action engine.

8. The system of claim 7 wherein the pattern analysis and recognition component is operative to determine an association between each of the plurality of events in the interactive environment and each user's response.

9. The system of claim 7 wherein the categorization component is operative to categorize each user's response as a decision metric and a timing measure of each user's response as a performance metric.

10. The system of claim 7 wherein the knowledge base is operative to store in the memory one or more associations between each user response and each of the plurality of events in the interactive environment.

11. The system of claim 8 wherein the association is based on at least one of a frequency of occurrence measure and a statistical relevance measure.

12. The system of claim 10 wherein the second knowledge engine is operative to search the one or more associations stored in the memory and to determine at least one decision metric and at least one performance metric to be applied by the at least one avatar in response to one or more events in the interactive environment.

13. The system of claim 2 wherein the action engine is operative to control the execution of the one or more actions of the at least one avatar in response to one or more requests from the second knowledge engine in at least one of an autonomous mode and a competitive duality mode of the interactive environment, each request of the second knowledge engine based on:
one or more associations between each user response and each of the plurality of events in the interactive environment, and
a categorization of each user response according to a decision metric and a timing measure of each user response according to a performance metric.

14. The system of claim 3 wherein the action engine is operative to control the execution of the one or more actions of the at least one avatar in response to one or more requests from the second knowledge engine in at least one of an autonomous mode and a competitive duality mode of the interactive environment, each request of the second knowledge engine based on:
one or more associations between each user response and each of the plurality of events in the interactive environment, and
a categorization of each user response according to a decision metric and a timing measure of each user response according to a performance metric.

15. The system of claim 6 wherein the real user mode comprises each user having exclusive control over the execution of the one or more actions of the at least one avatar in the interactive environment.

16. The system of claim 6 wherein the assisted duality mode comprises each user having shared control with the second knowledge engine and the action engine for supplemented execution of the one or more actions of the at least one avatar in the interactive environment.

17. The system of claim 6 wherein the competitive duality mode comprises each user having control over the execution of the one or more actions of a first avatar of the at least one avatar in the interactive environment and the second knowledge engine and the action engine having control over the execution of the one or more actions of a second avatar of the at least one avatar in the interactive environment, the first avatar and the second avatar having competitive roles in the interactive environment.

18. The system of claim 6 wherein the competitive duality mode comprises each user having control over the execution of the one or more actions of a first plurality of the at least one avatar in the interactive environment and the second knowledge engine and the action engine having control over the execution of the one or more actions of a second plurality of the at least one avatar in the interactive environment, each plurality comprising a collaborative team having competitive roles in the interactive environment.

19. The system of claim 6 wherein the autonomous operational mode comprises the second knowledge engine and the an action engine having exclusive control over the execution of the one or more actions of the at least one avatar in the interactive environment.

20. The system of claim 19 wherein the autonomous operational mode further comprises a tournament mode in which the second knowledge engine and the action engine have exclusive control over the execution of the one or more actions of each of the at least one avatar for each of the one or more users, each of the at least one avatar for each of the one or more users having competitive roles in the interactive environment.

21. The system of claim 19 wherein the autonomous operational mode further comprises a tournament mode in which the second knowledge engine and the action engine have exclusive control over the execution of the one or more actions of each of the at least one avatar for each of the one or more users, each of the at least one avatar having at least one of a collaborative role and a competitive role in the interactive environment.

22. The system of claim 20 wherein the at least one avatar is operative to communicate to each user.

23. The system of claim 22 wherein the at least one avatar is operative to communicate to each user using at least one of an electronic mail emergency action message and a voice message based on synthetic speech generation.

24. The system of claim 2 wherein the action engine comprises:
a knowledge engine interface operative to receive requests from the second knowledge engine to control the one or more actions of the at least one avatar in the interactive environment,
a rules database component operative to maintain a database of rules for execution control of the one or more actions of the at least one avatar, and
an action execution component operative to execute requests received from the knowledge engine interface to control the one or more actions of the at least one avatar in the interactive environment based on the database of rules for execution control maintained by the rules database component when the user does not have exclusive control of the at least one avatar.

25. The system of claim 24 wherein the action engine further comprises a subscriber registration component and an avatar activation component, the subscriber registration component operative to receive registration information from each user and to designate each user having registration information in a subscriber database as a registered user, the avatar activation component operative to activate at least one avatar for each registered user, the action execution component operative to execute received requests from the second knowledge engine to control the one or more actions of the at least one avatar only for each registered user based on the rules for execution control maintained by the rules database component.

26. The system of claim 3 wherein the action engine comprises:
a knowledge engine interface operative to receive requests from the second knowledge engine to control the one or more actions of the at least one avatar in the interactive environment,
a rules database component operative to maintain a database of rules for execution control of the one or more actions of the at least one avatar, and
an action execution component operative to execute requests received from the knowledge engine interface to control the one or more actions of the at least one avatar in the interactive environment based on the database of rules for execution control maintained by the rules database component when the user does not have exclusive control of the at least one avatar.

27. The system of claim 26 wherein the action engine further comprises a subscriber registration component and an avatar activation component, the subscriber registration component operative to receive registration information from each user and to designate each user having registration information in a subscriber database as a registered user, the avatar activation component operative to activate at least one avatar for each registered user, the action execution component operative to execute received requests from the second knowledge engine to control the one or more actions of the at least one avatar only for each registered user based on the rules for execution control maintained by the rules database component.

28. A system operative to execute and train at least one avatar for each user of an interactive environment, the system comprising:
a knowledge engine operative to continuously monitor each user's response to events in the interactive environment while each user controls the at least one avatar;
a knowledge base operative to store each of the monitored user responses to events in the interactive environment; and
an action engine operative to control one or more actions of the at least one avatar for each user in the interactive environment regardless of each user's control of the at least one avatar, the one or more actions based on pattern analysis of the stored monitored responses.

29. The system of claim 28 wherein the interactive environment is a computer-generated simulation environment.

30. The system of claim 29 wherein the interactive environment is a computer-generated game environment.

31. The system of claim 28 wherein the knowledge engine comprises an event monitoring component, a response monitoring component, an operational mode management component, the event monitoring component operative to continuously monitor events in the interactive environment, the response monitoring component operative to continuously monitor each user's responses to the events monitored by the event monitoring component, the operational mode management component operative to determine the actions of the at least one avatar in an operational mode of the interactive environment comprising at least one of a real user mode, an assisted duality mode, a competitive duality mode and an autonomous operational mode.

32. The system of claim 31 wherein the knowledge engine further comprises a pattern analysis and recognition component, a categorization component, a knowledge base interface controller and an action engine interface controller, the pattern analysis and recognition component operative to determine an association between each of the monitored events in the interactive environment and each user's response, the categorization component operative to categorize each user's response as a decision metric and a timing measure of each user's response as a performance metric, the knowledge base further operative to store in a memory one or more associations between each user's response and each of the events in the interactive environment, the knowledge base interface controller operative to communicate each association between the monitored events and each user's response, the action engine interface controller operative to communicate requests for the one or more actions of the at least one avatar.

33. The system of claim 32 wherein the association is based on at least one of a frequency of occurrence measure and a statistical relevance measure.

34. The system of claim 32 wherein the knowledge engine is operative to search the one or more associations stored in the memory and to determine at least one decision metric and at least one performance metric to be applied by the at least one avatar in response to one or more events in the interactive environment.

35. The system of claim 28 wherein the action engine is operative to control the execution of the one or more actions of the at least one avatar in response to one or more requests from the knowledge engine in at least one of an autonomous mode and a competitive duality mode of the interactive environment, each request of the knowledge engine based on:
one or more associations between each user response and each of the plurality of events in the interactive environment, and
a categorization of each user response according to a decision metric and a timing measure of each user response according to a performance metric.

36. The system of claim 31 wherein the real user mode comprises each user having exclusive control over the execution of the one or more actions of the at least one avatar in the interactive environment.

37. The system of claim 31 wherein the assisted duality mode comprises each user having shared control with the knowledge engine and the action engine for supplemented execution of the one or more actions of the at least one avatar in the interactive environment.

38. The system of claim 31 wherein the competitive duality mode comprises each user having control over the execution of the one or more actions of a first avatar of the at least one avatar in the interactive environment and the knowledge engine and the action engine having control over the execution of the one or more actions of a second avatar of the at least one avatar in the interactive environment, the first avatar and the second avatar having competitive roles in the interactive environment.

39. The system of claim 31 wherein the competitive duality mode comprises each user having control over the execution of the one or more actions of a first plurality of the at least one avatar in the interactive environment and the second knowledge engine and the action engine having control over the execution of the one or more actions of a second plurality of the at least one avatar in the interactive environment, each plurality comprising a collaborative team having competitive roles in the interactive environment.

40. The system of claim 31 wherein the autonomous operational mode comprises the knowledge engine and the action engine having exclusive control over the execution of the one or more actions of the at least one avatar in the interactive environment.

41. The system of claim 40 wherein the autonomous operational mode further comprises a tournament mode in which the knowledge engine and the action engine have exclusive control over the execution of the one or more actions of each of the at least one avatar for each of the one or more users, each of the at least one avatar for each of the one or more users having competitive roles in the interactive environment.

42. The system of claim 40 wherein the autonomous operational mode further comprises a tournament mode in which the second knowledge engine and the action engine have exclusive control over the execution of the one or more actions of each of the at least one avatar for each of the one or more users, each of the at least one avatar having at least one of a collaborative role and a competitive role in the interactive environment.

43. The system of claim 40 wherein the at least one avatar is operative to communicate to each user.

44. The system of claim 43 wherein the at least one avatar is operative to communicate to each user using at least one of an electronic mail emergency action message and a voice message based on synthetic speech generation.

45. The system of claim 28 wherein the action engine comprises:
a knowledge engine interface operative to receive requests from the knowledge engine to control the one or more actions of the at least one avatar in the interactive environment,
a rules database component operative to maintain a database of rules for execution control of the one or more actions of the at least one avatar, and
an action execution component operative to execute requests received from the knowledge engine interface to control the one or more actions of the at least one avatar in the interactive environment based on the database of rules for execution control maintained by the rules database component when the user does not have exclusive control of the at least one avatar.

46. The system of claim 43 wherein the action engine further comprises a subscriber registration component and an avatar activation component, the subscriber registration component operative to receive registration information from each user and to designate each user having registration information in a subscriber database as a registered user, the avatar activation component operative to activate at least one avatar for each registered user, the action execution component operative to execute received requests from the knowledge engine to control the one or more actions of the at least one avatar only for each registered user based on the rules for execution control maintained by the rules database component.

47. A method operative to monitor and evaluate the responses of a user in an interactive environment, the user controlling at least one avatar in the interactive environment, the method comprising:
monitoring events in the interactive environment using a knowledge engine;
monitoring each user's response to the monitored events in the interactive environment using the knowledge engine while each user controls the at least one avatar;
evaluating each of the monitored user responses using pattern analysis techniques to determine an association between one or more of the monitored user responses and each monitored event in the interactive environment, the knowledge engine operative to apply the one or more pattern analysis techniques to the monitored user responses and each monitored event; and
storing the determined association for each of the evaluated user responses.

48. The method of claim 47 wherein the interactive environment is a computer-generated simulation environment.

49. The method of claim 47 wherein the interactive environment is a computer-generated game environment.

50. The method of claim 47 further comprising categorizing each user response according to at least one decision metric, at least one performance metric and at least one emotion metric.

51. The method of claim 47 wherein the association is based on at least one of a frequency of occurrence measure and a statistical relevance measure.

52. The method of claim 47 wherein the knowledge engine comprises a first engine component and a second engine component, the first engine component included on a server device for evaluating the monitored user responses, determining the association and storing the determined association, and the second engine component included on a client device for monitoring the events in the interactive environment and for monitoring each user's response to the monitored events.

53. The method of claim 47 wherein the knowledge engine is operative to search one or more of the stored associations and to determine for each stored association at least one decision metric, at least one performance metric and at least one emotion metric.

54. The method of claim 53 wherein the at least one performance metric is a timing measure of each user response.

55. The method of claim 47 wherein the knowledge engine comprises an event monitoring component and a response monitoring component, the event monitoring component operative for the monitoring of events in the interactive environment, the response monitoring component operative for the monitoring of each user's response to the monitored events in the interactive environment while each user controls the at least one avatar.

56. The method of claim 55 wherein the knowledge engine further comprises a pattern analysis and recognition component and a categorization component, the pattern analysis and recognition component operative for determining the association between the one or more of the monitored user responses and each monitored event in the interactive environment, the categorization component operative to categorize each of the monitored user responses based at least one of a decision metric, a performance metric and an emotion metric, the performance metric comprising a timing measure of each of the monitored user responses.

57. The method of claim 53 wherein the at least one emotion metric is determined in part from the at least one performance metric and the at least one decision metric.

58. A method operative to control at least one avatar for each user of an interactive environment, the method comprising:
continuously monitoring events in the interactive environment using a knowledge engine;
evaluating a plurality of stored associations using the knowledge engine, each association representing one or more user responses to a monitored event in the interactive environment, the knowledge engine operative to apply one or more pattern analysis techniques to the one or more user responses to the monitored event;
controlling one or more actions of the at least one avatar for each user of the interactive environment in response to one or more continuously monitored events, the controlling of the one or more actions performed using an action engine, the one or more controlled actions based on the plurality of evaluated associations; and
displaying on at least one output device the one or more controlled actions of the at least one avatar.

59. The method of claim 58 wherein the interactive environment is a computer-generated simulation environment.

60. The method of claim 58 wherein the interactive environment is a computer-generated game environment.

61. The method of claim 58 further comprising categorizing the one or more user responses according to at least one of a decision metric, a performance metric and an emotion metric, the emotion metric based in part on the decision metric and the performance metric.

62. The method of claim 58 wherein the plurality of stored associations are stored in a knowledge base.

63. The method of claim 58 wherein the knowledge engine comprises an event monitoring component, a response monitoring component and an operational mode management component, the event monitoring component operative for performing the continuous monitoring of events in the interactive environment, the response monitoring component operative to monitor the one or more user responses to a monitored event, the operational mode management component operative to determine the one or more controlled actions of the at least one avatar in an operational mode of the interactive environment comprising at least one of a real user mode, an assisted duality mode, a competitive duality mode and an autonomous operational mode.

64. The method of claim 63 wherein the knowledge engine further comprises a pattern analysis and recognition component, a categorization component, a knowledge base interface controller and an action engine interface controller, the pattern analysis and recognition component operative to determine the plurality of stored associations, the categorization component operative to categorize each user's response according to a decision metric, a performance metric and an emotion metric, the knowledge base interface controller operative to communicate the plurality of stored associations, the action engine interface controller operative to communicate requests for the controlled one or more actions of the at least one avatar.

65. The method of claim 58 wherein the controlling of the one or more actions of the at least one avatar is performed regardless of each user's control of the at least one avatar using the action engine in at least one of an autonomous mode, an assisted duality mode and a competitive duality mode of the interactive environment.

66. The method of claim 65 wherein the controlling of the one or more actions is based on one or more requests from the knowledge engine, each request of the knowledge engine based on the plurality of stored associations and a categorization of the one or more user responses according to at least one of a decision metric, a performance metric and an emotion metric, the emotion metric based in part on the decision metric and the performance metric.

67. The method of claim 65 wherein the assisted duality mode comprises each user having shared control with the knowledge engine and the action engine for supplemented execution of the one or more actions of the at least one avatar in the interactive environment.

68. The method of claim 65 wherein the competitive duality mode comprises each user having control over the execution of the one or more actions of a first avatar of the at least one avatar in the interactive environment and the knowledge engine and the action engine having control over the execution of the one or more actions of a second avatar of the at least one avatar in the interactive environment, the first avatar and the second avatar having competitive roles in the interactive environment.

69. The method of claim 65 wherein the competitive duality mode comprises each user having control over the execution of the one or more actions of a first plurality of the at least one avatar in the interactive environment and the second knowledge engine and the action engine having control over the execution of the one or more actions of a second plurality of the at least one avatar in the interactive environment, each plurality comprising a collaborative team having competitive roles in the interactive environment.

70. The method of claim 65 wherein the autonomous operational mode comprises the knowledge engine and the action engine having exclusive control over the execution of the one or more actions of the at least one avatar in the interactive environment.

71. The method of claim 70 wherein the autonomous operational mode further comprises a tournament mode in which the knowledge engine and the action engine have exclusive control over the execution of the one or more actions of each of the at least one avatar for each of the one or more users, each of the at least one avatar for each of the one or more users having competitive roles in the interactive environment.

72. The method of claim 70 wherein the autonomous operational mode further comprises a tournament mode in which the second knowledge engine and the action engine have exclusive control over the execution of the one or more actions of each of the at least one avatar for each of the one or more users, each of the at least one avatar having at least one of a collaborative role and a competitive role in the interactive environment.

73. The method of claim 70 wherein the at least one avatar is operative to communicate to each user.

74. The method of claim 73 wherein the at least one avatar is operative to communicate to each user using at least one of an electronic mail emergency action message and a voice message based on synthetic speech generation.

75. The method of claim 66 wherein the action engine comprises:
a knowledge engine interface operative to receive requests from the knowledge engine to control the one or more actions of the at least one avatar in the interactive environment,
a rules database component operative to maintain a database of rules for the controlling of the one or more actions of the at least one avatar, and
an action execution component operative to execute requests received from the knowledge engine interface for the controlling of the one or more actions of the at least one avatar in the interactive environment based on the database of rules when the user does not have exclusive control of the at least one avatar.

76. The method of claim 75 wherein the action engine further comprises a subscriber registration component and an avatar activation component, the subscriber registration component operative to receive registration information from each user and to designate each user having registration information in a subscriber database as a registered user, the avatar activation component operative to activate at least one avatar for each registered user, the action execution component operative to execute received requests from the knowledge engine for controlling the one or more actions of the at least one avatar only for each registered user based on the database of rules maintained by the rules database component.

77. A computer-readable medium having instructions stored thereon for performing a method comprising:
continuously monitoring each user's response to monitored events in an interactive environment while each user controls at least one avatar, the monitoring of each user's response and the monitoring of the events performed using a knowledge engine;
storing an association between one or more of the continuously monitored user responses and each of the monitored events in the interactive environment, the knowledge engine operative to apply one or more pattern analysis techniques to the monitored user responses and each of the monitored events;
controlling one or more actions of the at least one avatar for each user in the interactive environment based on the stored association regardless of each user's control of the at least one avatar, the controlling of the one or more actions performed using an action engine; and displaying the one or more controlled actions of the at least one avatar for each user in the interactive environment.

78. The computer-readable medium of claim 77 wherein the interactive environment is a computer-generated simulation environment.

79. The computer-readable medium of claim 77 wherein the interactive environment is a computer-generated game environment.

80. The computer-readable medium of claim 77 wherein the knowledge engine is operative to store the association in a knowledge base.

81. The computer-readable medium of claim 77 wherein the controlling of the one or more actions is performed using the action engine when the operational mode of the interactive environment is at least one of an assisted duality mode, a competitive duality mode and an autonomous mode.

82. The computer-readable medium of claim 80 wherein the knowledge engine is further operative to search the knowledge base for one or more stored associations.

83. The computer-readable medium of claim 77 wherein the action engine controls the one or more actions of the at least one avatar in response to at least one request from the knowledge engine.

84. The computer-readable medium of claim 80 wherein the knowledge engine is further operative to categorize the continuously monitored user responses according to at least one of a decision metric, a performance metric and an emotion metric, the emotion metric based in part on the decision metric and the performance metric.

85. The computer-readable medium of claim 81 wherein the assisted duality mode comprises each user having shared control of the one or more actions of the at least one avatar with a knowledge engine and the action engine.

86. The computer-readable medium of claim 81 wherein the competitive duality mode comprises each user controlling the one or more actions of a first avatar of the at least one avatar in the interactive environment and a knowledge engine and the action engine controlling the one or more actions of a second avatar of the at least one avatar in the interactive environment, the first avatar and the second avatar having competitive roles in the interactive environment.

87. The computer-readable medium of claim 81 wherein the competitive duality mode comprises each user controlling the one or more actions of a first plurality of the at least one avatar in the interactive environment and the second knowledge engine and the action engine controlling the one or more actions of a second plurality of the at least one avatar in the interactive environment, each plurality comprising a collaborative team having competitive roles in the interactive environment.

88. The computer-readable medium of claim 81 wherein the autonomous mode comprises a knowledge engine and the action engine exclusively controlling the one or more actions of the at least one avatar in the interactive environment.

89. The computer-readable medium of claim 88 wherein the autonomous mode further comprises a tournament mode in which the knowledge engine and the action engine exclusively control the one or more actions of each of the at least one avatar for each user, each of the at least one avatar for each user having competitive roles in the interactive environment.

90. The computer-readable medium of claim 88 wherein the autonomous mode further comprises a tournament mode in which the second knowledge engine and the action engine have exclusive control over the execution of the one or more actions of each of the at least one avatar for each of the one or more users, each of the at least one avatar having at least one of a collaborative role and a competitive role in the interactive environment.

91. The computer-readable medium of claim 88 wherein the at least one avatar is operative to communicate to each user.

92. The computer-readable medium of claim 91 wherein the at least one avatar is operative to communicate to each user using at least one of an electronic mail emergency action message and a voice message based on synthetic speech generation.

93. The computer-readable medium of claim 77 wherein the one or more controlled actions are displayed on at least one of a mobile device, a handheld device, a television, a portable computer and a desktop computer monitor.

94. The computer-readable medium of claim 93 wherein the mobile device is at least one of a mobile telephone, a smart phone and a personal digital assistant.

95. The computer-readable medium of claim 93 wherein the handheld device is a handheld computer gaming console.

96. The system of claim 8 wherein the pattern analysis and recognition component is further operative to apply one or more pattern analysis techniques to each of the continuously monitored user responses to the plurality of events in the interactive environment, and wherein the association is determined from the one or more applied pattern analysis techniques.

97. The system of claim 32 wherein the pattern analysis and recognition component is further operative to apply one or more pattern analysis techniques to each of the continuously monitored user responses to the plurality of events in the interactive environment, and wherein the association is determined from the one or more applied pattern analysis techniques.

* * * * *